United States Patent
Zhu

(10) Patent No.: US 12,263,876 B1
(45) Date of Patent: Apr. 1, 2025

(54) EXTENDED COLLAPSIBLE WAGON

(71) Applicant: MAXTON ENGINEERING LTD., Wan Chai (HK)

(72) Inventor: Shou Qiang Zhu, Wan Chai (HK)

(73) Assignee: MAXTON ENGINEERING LTD., Central (HK)

( * ) Notice: Subject to any disclaimer, the term of this patent is extended or adjusted under 35 U.S.C. 154(b) by 527 days.

(21) Appl. No.: 17/692,160

(22) Filed: Mar. 10, 2022

Related U.S. Application Data

(60) Provisional application No. 63/159,426, filed on Mar. 10, 2021.

(51) Int. Cl.
*B62B 3/02* (2006.01)
*B62B 3/00* (2006.01)
*B62B 5/06* (2006.01)

(52) U.S. Cl.
CPC ............... *B62B 3/02* (2013.01); *B62B 3/007* (2013.01); *B62B 5/067* (2013.01)

(58) Field of Classification Search
CPC ...... B62B 3/025; B62B 3/007; B62B 2205/06
See application file for complete search history.

(56) References Cited

U.S. PATENT DOCUMENTS

| | | | |
|---|---|---|---|
| 416,750 A * | 12/1889 | Rousseau | B62B 7/062 |
| | | | 280/649 |
| 2,020,766 A * | 11/1935 | Brown | B62B 3/106 |
| | | | 220/9.3 |
| 2,049,683 A * | 8/1936 | Baumgardner | B62B 3/02 |
| | | | 248/129 |
| 8,011,686 B2 | 9/2011 | Chen | |
| 9,327,749 B2 | 5/2016 | Young | |
| 9,440,668 B1 * | 9/2016 | Chen | B62B 5/0013 |
| 10,081,380 B2 | 9/2018 | Fitzwater | |
| 10,099,712 B1 | 10/2018 | Sun | |
| 10,435,055 B1 | 10/2019 | Zhu | |
| 10,583,852 B2 | 3/2020 | Fitzwater | |
| 11,293,197 B2 * | 4/2022 | Goldszer | E04H 15/46 |
| 2015/0145224 A1 * | 5/2015 | Zhu | B62B 3/007 |
| | | | 280/42 |
| 2018/0297622 A1 * | 10/2018 | Chen | B62B 5/0003 |

(Continued)

FOREIGN PATENT DOCUMENTS

CN 204161406 U 2/2015

*Primary Examiner* — Katy M Ebner
(74) *Attorney, Agent, or Firm* — LIU & LIU

(57) ABSTRACT

An extended collapsible wagon including a handle, a first supporting frame, and a second supporting frame. The first supporting frame and the second supporting frame are connected with a pair of connecting members. Each connecting member comprises three scissor hinge structures. A folding base frame is provided below the receiving space defined between the first and second supporting frames and the pair of connecting members, to provide a sturdy support structure for the flexible container. The folding base frame includes first and second base frame panels located below respective one of two adjacent scissor hinge structures and a third base frame panel having two sub-panels pivotally connected to fold below the third scissor hinge structure. The first base frame is pivotally connected to the second base frame panel, and the second base frame is pivotally connected to the third base frame, so as to form the foldable base frame.

15 Claims, 20 Drawing Sheets

(56) References Cited

U.S. PATENT DOCUMENTS

| | | | |
|---|---|---|---|
| 2021/0039696 A1* | 2/2021 | Tong | B62B 3/02 |
| 2021/0107548 A1* | 4/2021 | Wang | B62B 3/007 |
| 2021/0107549 A1* | 4/2021 | Wang | B62B 3/007 |
| 2022/0041199 A1* | 2/2022 | Tong | B62B 3/025 |
| 2023/0406384 A1* | 12/2023 | Sun | B62B 3/02 |
| 2024/0166252 A1* | 5/2024 | Wu | B62B 3/002 |
| 2024/0286660 A1* | 8/2024 | Luo | B62B 3/022 |
| 2024/0300561 A1* | 9/2024 | Zhang | B62B 3/002 |

* cited by examiner

EXTENDED COLLAPSIBLE WAGON

FIELD OF THE INVENTION

The present invention is directed to a collapsible and portable wagon or wagon, and in particular to a collapsible wagon that can be used to store and transport various items, and the size of the wagon can be easily minimized when not in use.

BACKGROUND OF THE INVENTION

In recent years, more and more people love outdoor and recreational activities such as camping, field trips, or Bar-B-Q during their free time because many people may endure high pressure at work, and have accumulated a lot of tension and stress. Not only can these outdoor activities help people release the stress, but also improve quality of life. When people enjoy their outdoor activities, wagons or wagons are primarily used for storing and transporting food, groceries and Bar-B-Q items, and even little child can be put therein.

Throughout the time, portable wagons have been developed so the wagons can be transported in a confined space (such as vehicle trunk), and quickly converted into a three-dimensional space supported by wheels to store and transport a plurality of items when arriving to the outdoor destination such as parks, camping site, beaches, etc.

U.S. Patent U.S. Pat. No. 8,011,686B2 to Chen discloses a folding wagon having a folding frame with a stowed position and an open position. The folding frame comprises a pair of front and rear vertical supports. The folding frame further comprises a pair of front supplemental links and a pair of rear supplemental links. A plurality of flatbed supports form a central flatbed support joint in the middle of the wagon. The central flatbed support joint folds upward when the folding frame is being configured into stowed position, and the plurality of flatbed supports are pivotally connected to the pair of front vertical supports and the pair of rear vertical supports. Wheels are attached to the folding frame. The capacity of this foldable wagon and the length of an item that can fit into the fabric bed of this foldable wagon are limited between the pair of front and rear vertical supports.

U.S. Pat. Application Publication US20150145224A1 to Zhu discloses an extended collapsible cart including a handle; a first supporting frame; a second supporting frame; and a connecting member including a plurality of connecting units and connecting rods, wherein the connecting units and the connecting rods are pivotally connected to the first supporting frame and the second supporting frame. So when the first supporting frame and second supporting frame are moved toward each other, the movement of the two supporting frames triggers the collapse of the connecting member to minimize the size of the cart. The capacity of this collapsible cart potentially increases by about 50% over the foldable wagon disclosed in US80116886.

There remains a need for a new and improved extended collapsible wagon that provides a sturdy foldable base frame to support a basket of the collapsible wagon without substantially increasing the size and weight of the frame of the collapsible wagon.

SUMMARY OF THE INVENTION

It is an object of the present invention to provide an extended collapsible (or foldable) wagon (or wagon) having a sturdy foldable base frame to support a basket of the collapsible wagon without substantially increasing the size and weight of the frame of the collapsible wagon.

It is another object of the present invention to provide an extended collapsible wagon, the size of which can be easily minimized so the user can easily transport the wagon to any destination the user wants to go, and uses the wagon in the destination, such as a camping spot, park, etc.

In one aspect, a collapsible wagon may include a handle, a first supporting frame, and a second supporting frame. In one embodiment, the handle is movably secured at the first supporting frame, and the first supporting frame and the second supporting frame are connected with a pair of connecting members. Each connecting member may include a plurality of connecting units. The connecting member is used not only to connect the first and second supporting frames and, but also collapse the wagon to a compact size, so it is convenient for the user to carry it out and store it in the garage or car trunk. In one embodiment, the collapsible wagon further includes a fabric secured at a receiving space created by the supporting frames and the connecting members on both sides. When the wagon is fully unfolded, the connecting units are substantially perpendicular to the second supporting frame and the first supporting frame respectively to strengthen the connecting member.

In an exemplary embodiment, the pair of collapsible connecting members pivotally connect to an upper portion and a lower portion of the respective first and second supporting frames, wherein the pair of connecting members can be configured between an extended configuration in which the first and second supporting frames are spaced apart and a receiving space is defined between the first and second supporting frames and the pair of connecting members, and a collapsed configuration in which the first supporting frame is brought close to the second supporting frame to collapse the receiving space, and wherein each connecting member comprises a plurality of (e.g., three) scissor hinge structures pivotally interconnecting between the first and second supporting frames.

A collapsible container made of a flexible material is provided in the receiving space in the extended configuration of the pair of connecting members, and wherein the container is collapsed as the receiving space is collapsed in the collapsed configuration of the pair of connecting members.

In a further aspect of the present invention, a foldable base frame is provided below the receiving space defined between the first and second supporting frames and the pair of connecting members, to provide a sturdy support structure for the flexible container to support heavy items on the folding base frame. The foldable base frame is pivotally coupled to the first and second supporting frames and the pair of connecting members. In one embodiment, the collapsible wagon comprises three scissor hinge structures. The foldable base frame comprises first and second base frame panels each below respective one of two adjacent scissor hinge structures, wherein each of the first and second base frame panels are substantially flat and each not foldable, and a third base frame panel below the third scissor hinge structure and having two sub-panels pivotally connected to fold, and wherein the first base frame panel is pivotally connected to the second base frame panel, and the second base frame panel is pivotally connected to the third base frame, so as to form the foldable base frame.

In the fully extended configuration of the collapsible wagon, the foldable base frame unfolds to an overall substantially flat support structure for supporting the flexible collapsible container. In the fully collapsed configuration of the collapsible wagon, the foldable base frame folds to bring the flat first, second and third base frame panels close to each other, wherein the third frame panel further folds to bring its two sub-panels close together, so as to fold/collapse the base frame from a configuration of the overall substantially flat support structure into a configuration of an overall folded structure.

The capacity of the inventive collapsible wagon and the length of an item that can fit into the collapsible container of this foldable wagon are therefore increased, e.g., by 50%. as compared to a foldable wagon having only two scissor hinge structures.

When the user finishes using the wagon, the size of the wagon can be significantly reduced to just occupy a minimum space. More particularly, the structure of the wagon starts to collapse when the first supporting frame and the second supporting frame are squeezed toward the center portion of the wagon. Each of the first and second connecting members has one end pivotally connected to the first supporting frame, and another end pivotally connected to the second supporting frame, so when the first supporting frame and second supporting frame are being moved toward each other, the movement of the two supporting frames triggers the collapse of the connecting member to minimize the size of the wagon.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
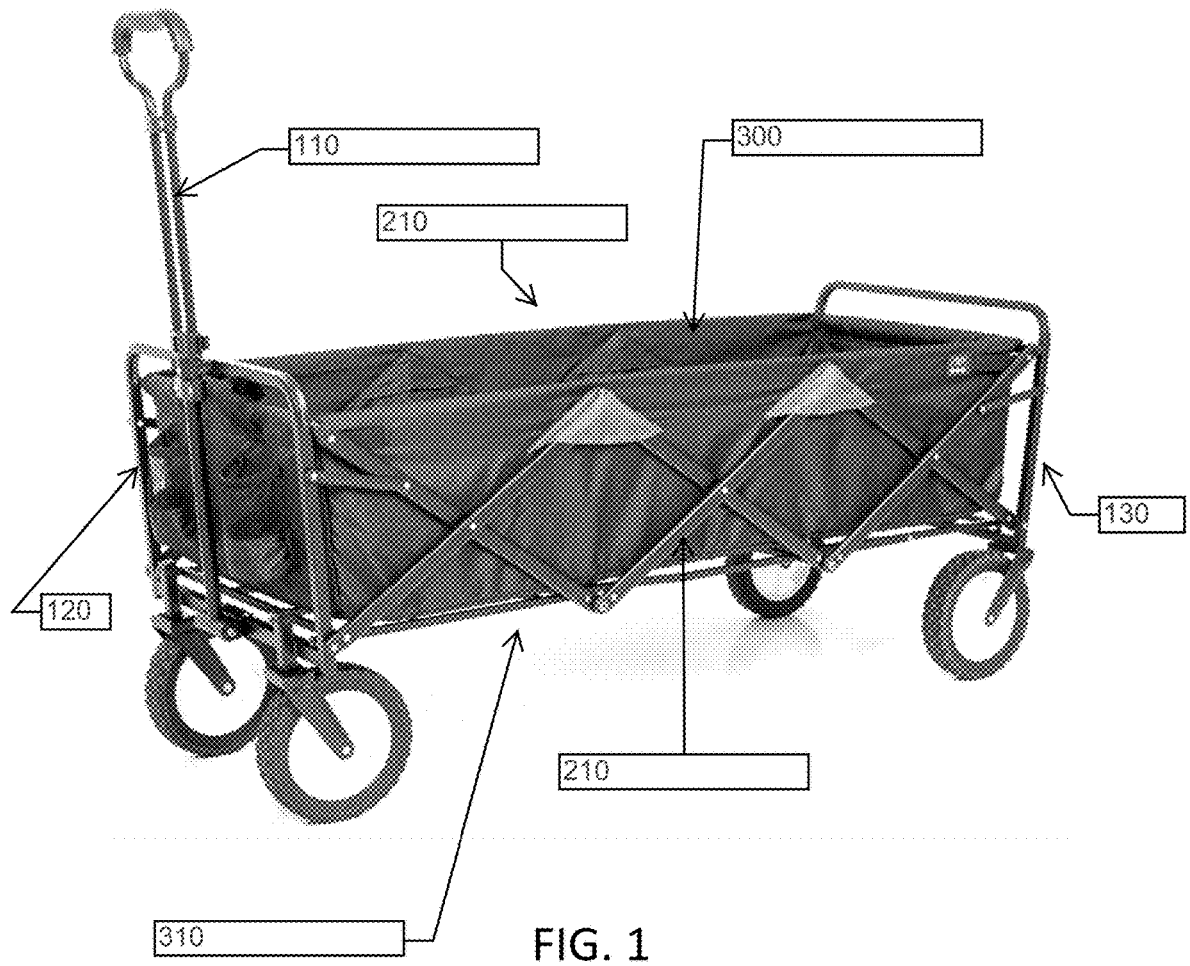
FIG. 1 is a perspective view of an extended collapsible wagon, shown in a fully extended state, comprising a base frame portion and a flexible basket attached thereon, in accordance with one embodiment of the present invention, showing the handle attached to the collapsible wagon is in an extended state (the collapsible wagon is symmetrical about a longitudinal median extending between its front and rear sides)

FIG. 1 is a perspective view of an extended collapsible wagon, shown in a fully extended state, comprising a base frame portion and a flexible container/basket attached thereon, in accordance with one embodiment of the present invention, showing the handle attached to the collapsible wagon is in an extended state (the collapsible wagon is symmetrical about a longitudinal median extending between its front and rear sides).

Figure 2:
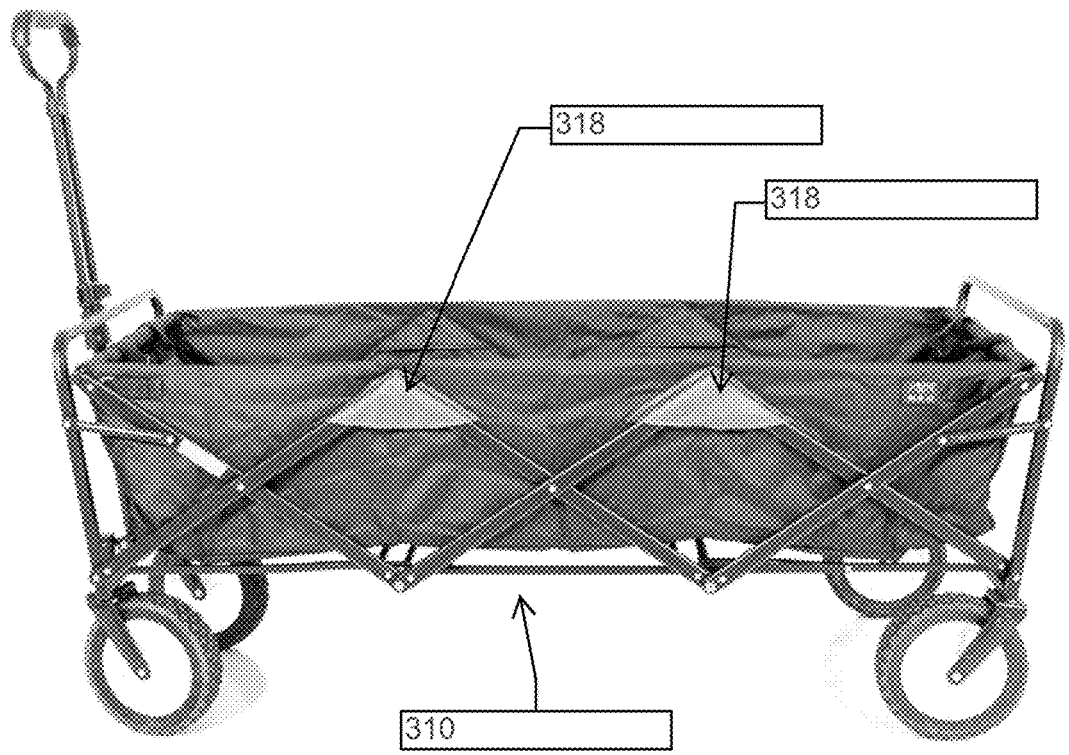
FIG. 2 is a left side view thereof.
Figure 3:
FIG. 3 is a right side view thereof.
Figure 4:
FIG. 4 is a top view thereof.
Figure 5:
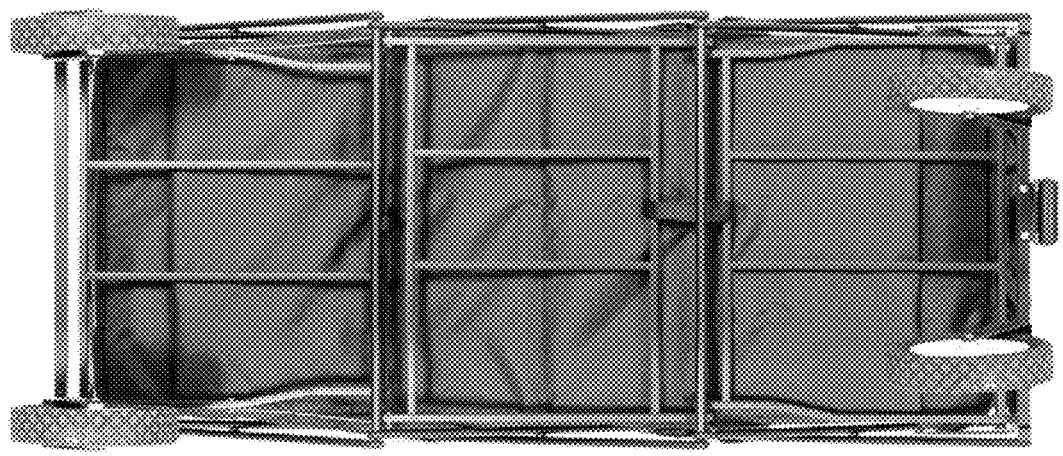
FIG. 5 is a bottom view thereof.
Figure 6:
FIG. 6 is a front end view thereof.
Figure 7:
FIG. 7 is a rear end view thereof.
Figure 8:
FIG. 8 is a left side view thereof, shown in a transitional state of collapse.
Figure 9:
FIG. 9 is a left side view thereof, shown in a further transitional state of collapse.
Figure 10:
FIG. 10 is a perspective view thereof, shown in the further transitional state of collapse, with the handle attached to the front end thereof in a retracted state.

In one aspect, the collapsible wagon may include a handle 110, a first supporting frame 120, and a second supporting frame 130. In one embodiment, the handle is movably secured at the first supporting frame 120, and the first supporting frame 120 and the second supporting frame 130 are connected with a pair of connecting members 210 on the longitudinal sides of the collapsible wagon, as shown in FIGS. 1 to 3. The pair of connecting members 210 are used not only to connect the first and second supporting frames 120 and 130, but also collapse the wagon to a compact size, so it is convenient for the user to carry it out and store it in the garage or car trunk. When the wagon is fully unfolded in the fully extended configuration, the connecting members 210 are each substantially perpendicular to the first and second supporting frames (120, 130) respectively to strengthen the connecting members 210 in the extended configuration.

The connecting member 210 resembles a scissor hinge structure, which interconnects between the first supporting frame 120 and the second supporting frame 130. In an exemplary embodiment, the pair of collapsible connecting members 210 pivotally connect to an upper portion and a lower portion of the respective first and second supporting frames (120, 130), wherein the pair of connecting members 210 can be configured between an extended configuration in which the first and second supporting frames (120, 130) are spaced apart and a receiving space is defined between the first and second supporting frames (120, 130) and the pair of connecting members 210, and a collapsed configuration in which the first supporting frame 120 is brought close to the second supporting frame 130 to collapse the receiving space, and wherein each connecting member 210 comprises a plurality of (e.g., three) scissor hinge structures pivotally interconnecting between the first and second supporting frames (120, 130).

In one embodiment, the collapsible wagon further includes a collapsible container 300 made of a flexible material (e.g., synthetic or natural fabric, canvas, mesh, netting, polyester, polyurethane, PVC, etc.) secured at a receiving space created by the supporting frames (120, 130) and the pair of connecting members 210 on both sides. The container 300 is collapsed as the receiving space is collapsed in the collapsed configuration of the pair of connecting members 210. FIG. 2 shows inverted triangular pockets 318 on a longitudinal side of the flexible container 300, in accordance with one embodiment of the present invention. The pockets 318 each covers a top pivotal connection between adjacent scissor hinge structures in each pair of connecting members 210.

In a further aspect of the present invention, a foldable base frame 310 is provided below the receiving space defined between the first and second supporting frames (120, 130) and the pair of connecting members 210, to provide a sturdy support structure for the base of the flexible container 300 to support heavy items on the folding base frame 310. In one embodiment, the collapsible wagon comprises three scissor hinge structures as shown in the drawings. The foldable base frame 310 comprises first and second base frame panels (311, 312) each below respective one of two adjacent scissor hinge structures, wherein each of the first and second base frame panels (311, 312) are substantially flat and each not foldable below the respective scissor hinge structures, and a third base frame panel 313 having two sub-panels (314, 315) pivotally connected to fold below the third scissor hinge structure, and wherein the first base frame panel 311 is pivotally connected to the second base frame panel 312 at one edge thereof, and the second base frame 312 is pivotally connected to the third base frame panel 313, so as to form the overall foldable base frame 310. The other end of the first base frame panel 311 is pivotally connected to proximate the first end of the second connecting unit (214) of the first scissor section near a lower portion of the first supporting frame 120. The other end of the second base frame panel 312 is pivotally connected to proximate the second end of the first connecting unit (213) of the second scissor hinge structure.

In the illustrated embodiment, each of the first, second and third base frame panels (311, 312, 313 (including sub-panels (314, 315))) comprises a grid of interconnecting bars to form an overall grid panel configuration.

In the illustrated embodiment of the third base frame panel, the sub-panel 315 comprises a grid of interconnecting bars to form an overall grid panel configuration, and the sub-panel 314 comprises two bars pivotally connected to a mid-section or mid-point of the edge bars of the sub-panel 315. The other end of the sub-panel 314 (or the other ends of the bars thereof) is pivotally connected to proximate the first end of the second connecting unit (214) of the third scissor hinge structure. The other end of the sub-panel 315 is pivotally connected to proximate the second end of the first connecting unit (213) of the third scissor hinge structure.

Figure 13:
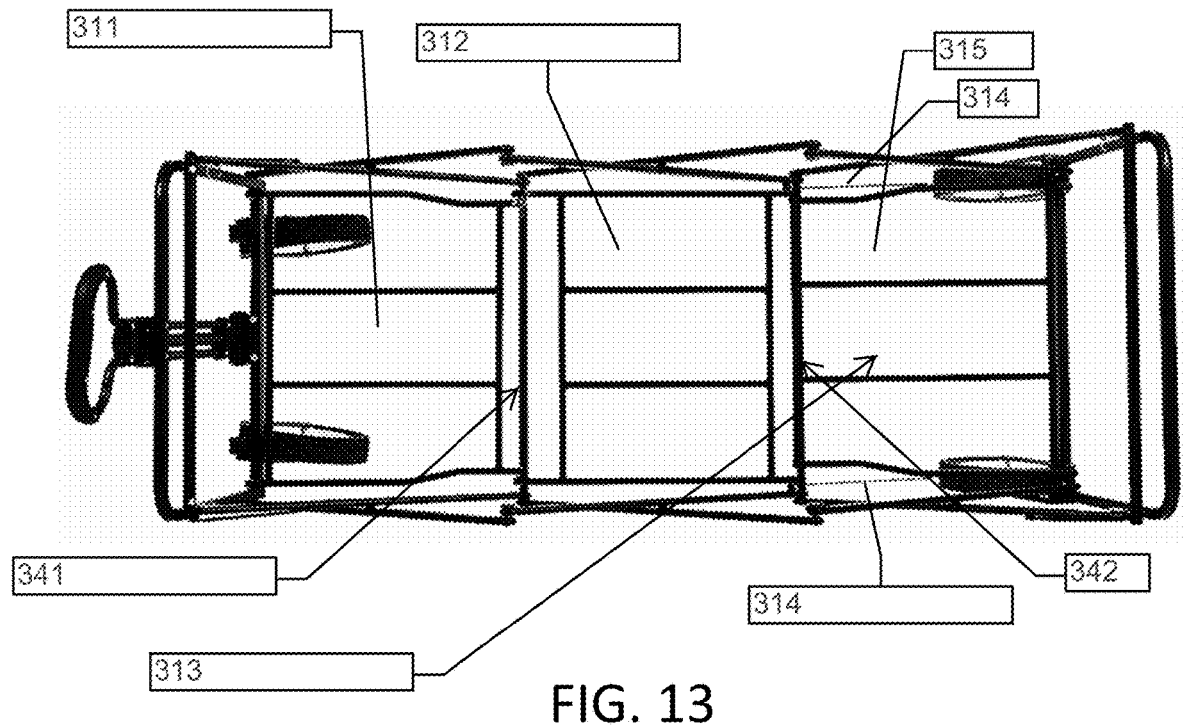
FIG. 13 is a top view thereof.
Figure 14:
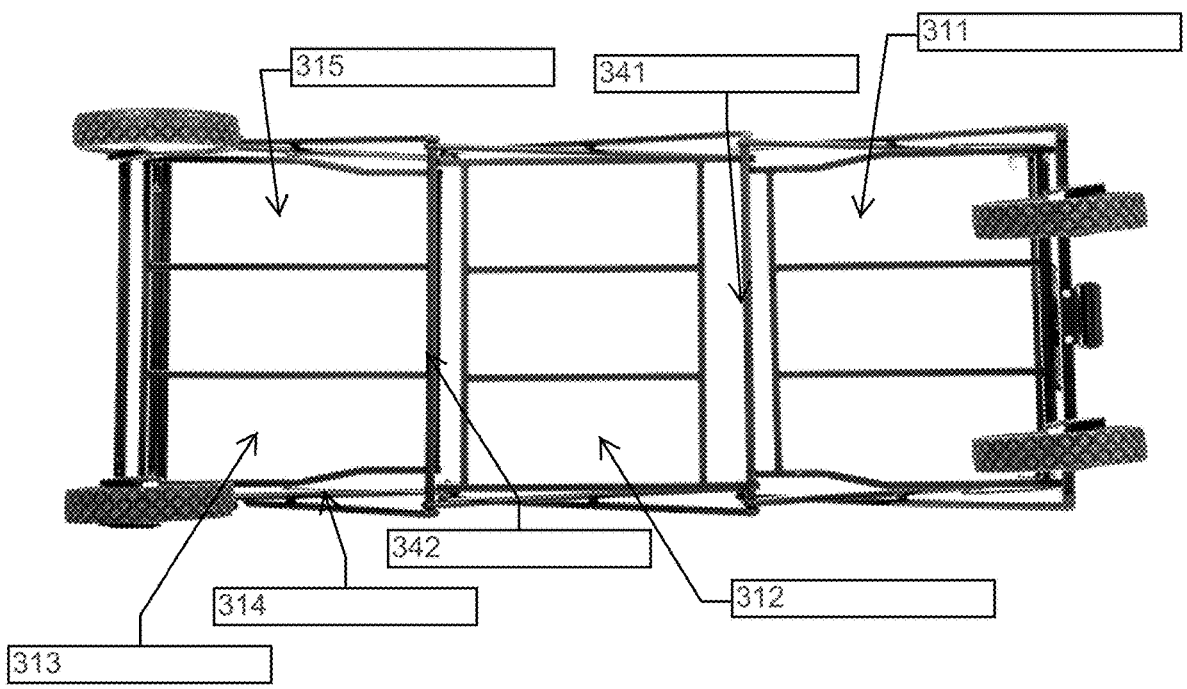
FIG. 14 is a bottom view thereof.
Figure 15:
FIG. 15 is a front end view thereof.
Figure 16:
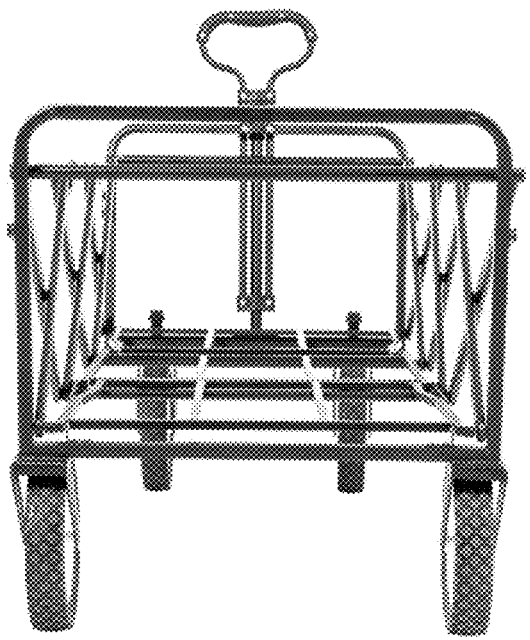
FIG. 16 is a rear end view thereof.

As illustrated in FIGS. 13 and 14, the first and second base frame panels (311, 312) and the sub-panel 315 of the third base frame panel 313 each extend to span substantially the same area (in other words, these panels and sub-panel have generally similar coverage as a supporting platform, each about one-third of the overall support area of the overall foldable base frame 310, and together extend to span substantially the overall support area of the overall foldable base frame 310 which generally conform to the overall area of the base of the container 300). Hence, in the folded configuration of the foldable base frame 310 (shown in FIG. 21), the sub-panel 315, the first and second base frame panels (311, 312) and the sub-panel 315 of the third base frame panel 313 are stacked sideways against each other in a collapsed configuration.

Figure 12:
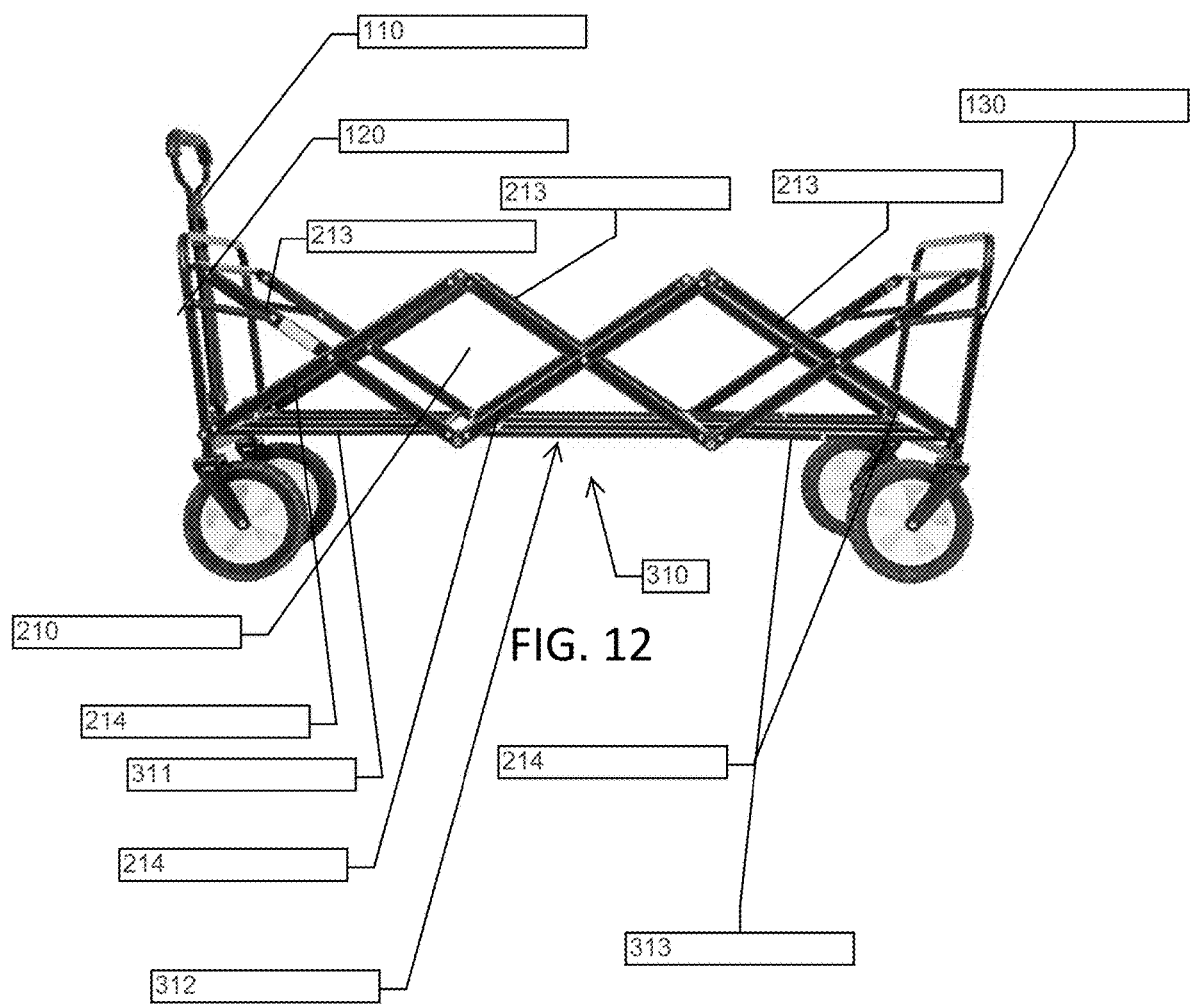
FIG. 12 is a left side view of frame only of the collapsible wagon in FIG. 1, with the flexible basket removed.

In the fully extended configuration of the collapsible wagon, the foldable base frame 310 unfolds to an overall substantially flat support structure for supporting the flexible collapsible container 300. As shown in the drawings, interconnected between the pair of connecting members 210 are two bars 341 and 342. Specifically, the interconnecting bar 341 interconnects the pivot connection 351 between the first scissor structure and the second scissor structure, and the interconnecting bar 342 interconnects the pivot connection 352 between the second scissor structure and the third scissor structure. Following the progression of unfolding the wagon/frame as shown in the sequence from FIG. 17 to FIG. 18 to FIG. 12, in the fully extended configuration of the collapsible wagon as shown in FIG. 12, the pivotally connected region of the first and second base frame panels (311, 312) rest on the bar 341, the free/distal edge region of the sub-panel 315 (i.e., the un-hinged/pivoted edge/end of the sub-panel 315) rests on the bar 342, thus the first, second and third base frame panels (311, 312, 313 (314, 315)) form a substantially flat support structure for the base of the container 300. As more clearly seen in FIGS. 13 and 14, the width of the free/distal edge region of the sub-panel 315 is narrower than the width of the adjacent edge region of the second base frame panel 312.

FIGS. 2 and 12 illustrate the fully extended configuration of the connecting members 210, thus providing the maximum space to retain the container 300 to provide maximum storage capacity in the container 300. The capacity of the inventive collapsible wagon and the length of an item that can fit into the collapsible container of this foldable wagon are therefore increased, e.g., by 50%. as compared to a foldable wagon having only two scissor hinge structures.

As shown in FIGS. 17 to 20, the foldable base frame 310 has been pivoted to fold upwards at two pivotally connected regions of the three base frame panels (311, 312, 313). In particular, the first and second base frame panels (311, 312)

fold upwards at the pivotal connection therebetween, and the sub-panels (314, 315) of the third base frame panel (313) fold upwards at the pivotal connection therebetween. As seen in the drawings, the pivotal connections between the first and second base frame panels and between the first and second scissor hinge structures are substantially in line lying along a vertical plane. The pivotal connections between the second and third base frame panels and between the second and third scissor hinge structures are substantially in line lying along a vertical plane.

Figure 21:
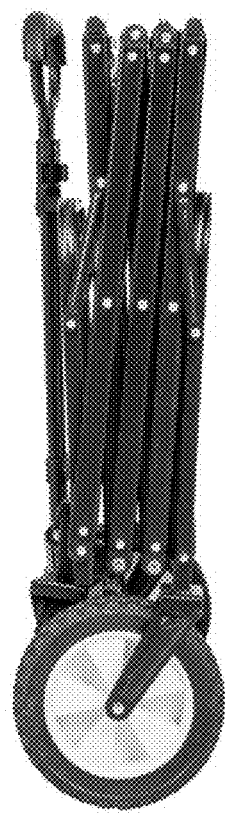
FIG. 21 is a left side view thereof, shown in a full state of collapse.
Figure 22:
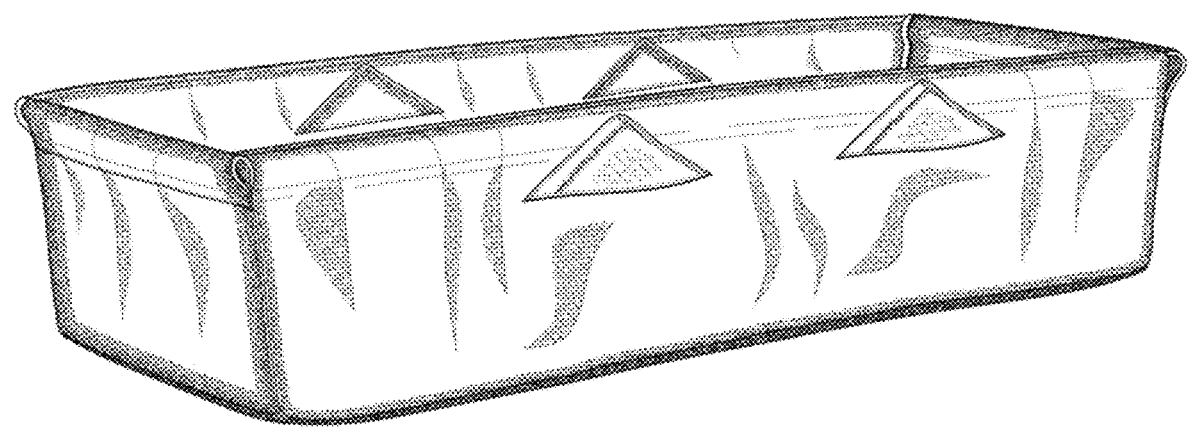
FIG. 22 is a perspective view of a flexible basket for a collapsible wagon in accordance with one embodiment of the present invention.
Figure 23:
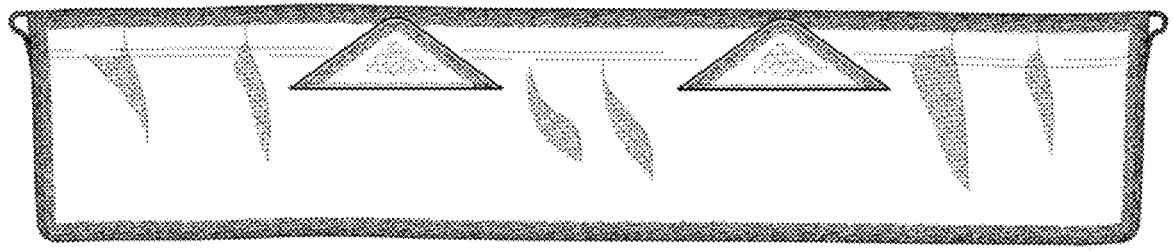
FIG. 23 is a left side view thereof.
Figure 24:
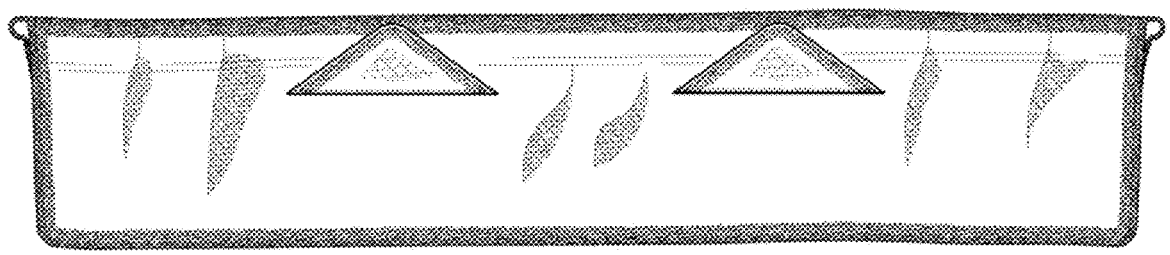
FIG. 24 is a right side view thereof.
Figure 25:
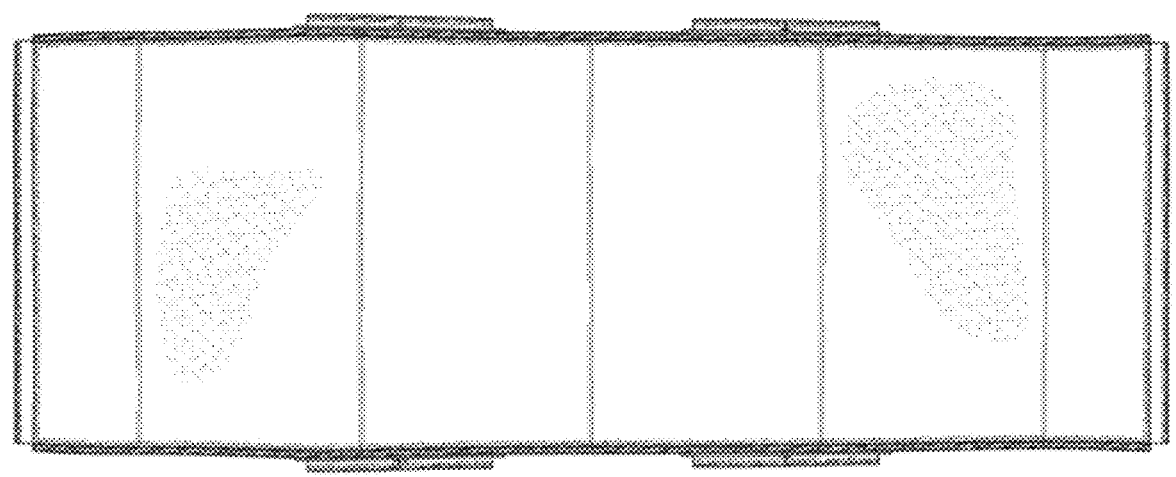
FIG. 25 is a top view thereof.
Figure 26:
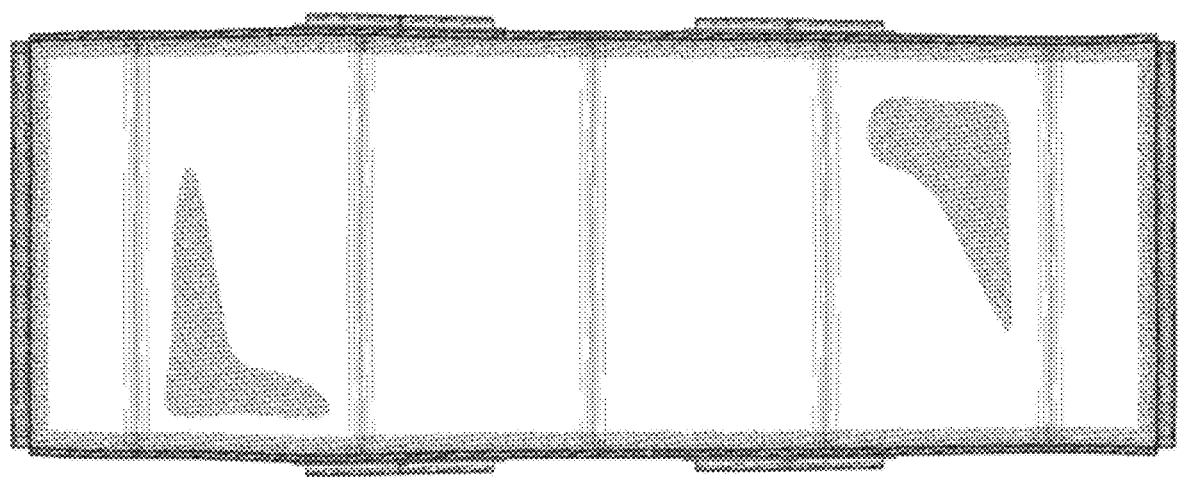
FIG. 26 is a bottom view thereof.
Figure 27:
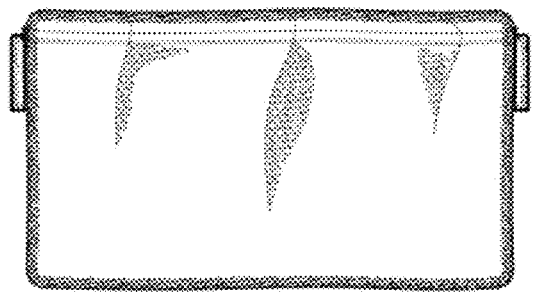
FIG. 27 is a front end view thereof.
Figure 28:
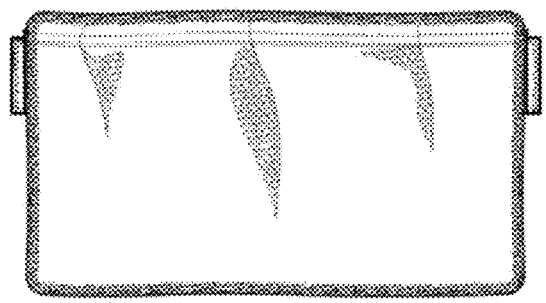
FIG. 28 is a rear end view thereof.
Figure 29:
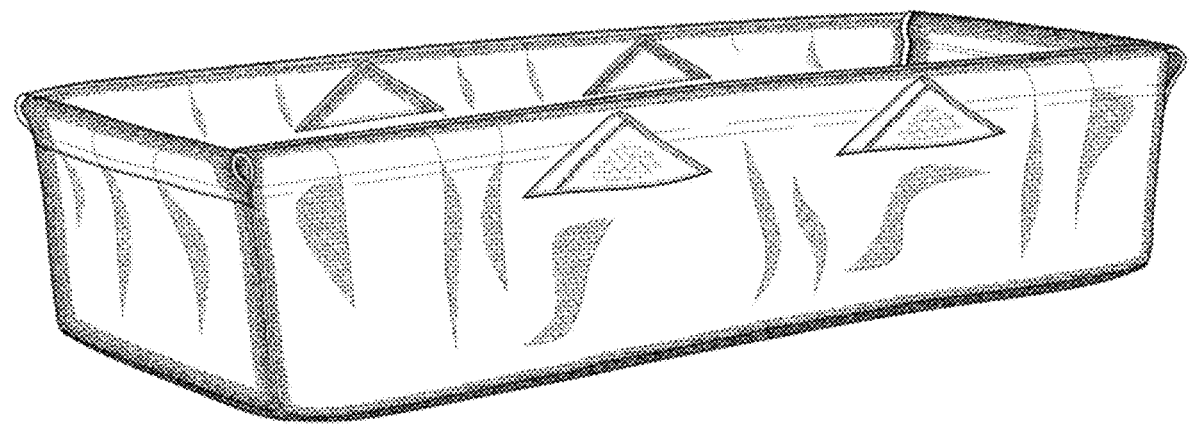
FIG. 29 is a perspective view showing triangular pockets on a longitudinal side of the flexible basket in FIG. 22, in accordance with one embodiment of the present invention.
Figure 30:
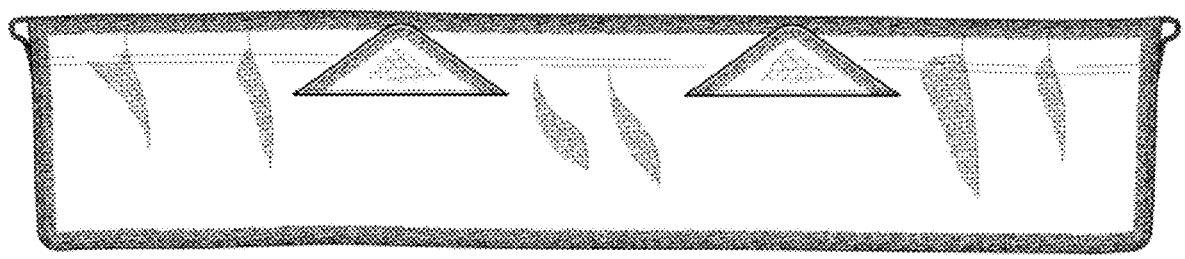
FIG. 30 is a side view showing triangular pockets on the longitudinal side of a flexible basket, the other side being a mirror image thereof.
Figure 31:
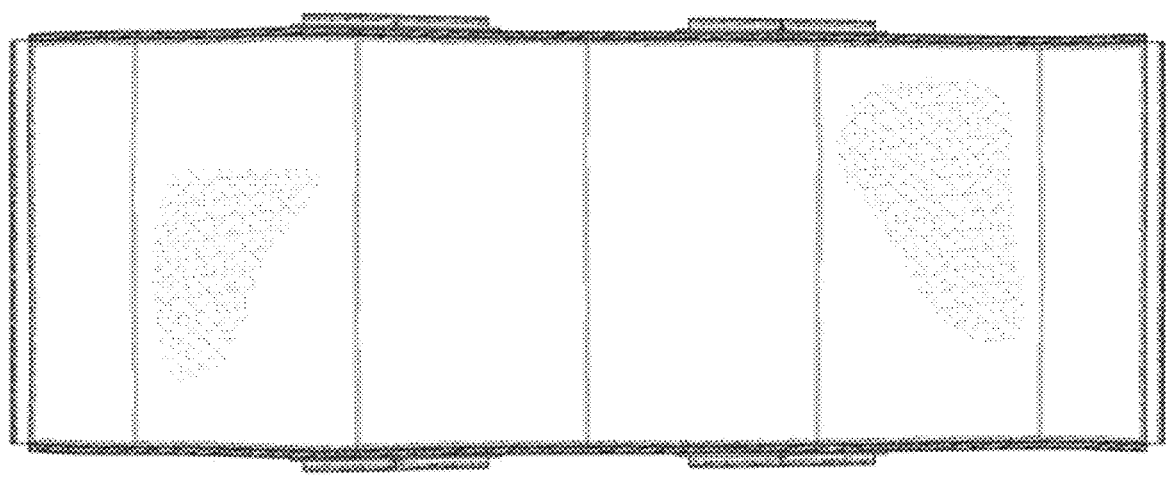
FIG. 31 is a top view thereof.
Figure 32:
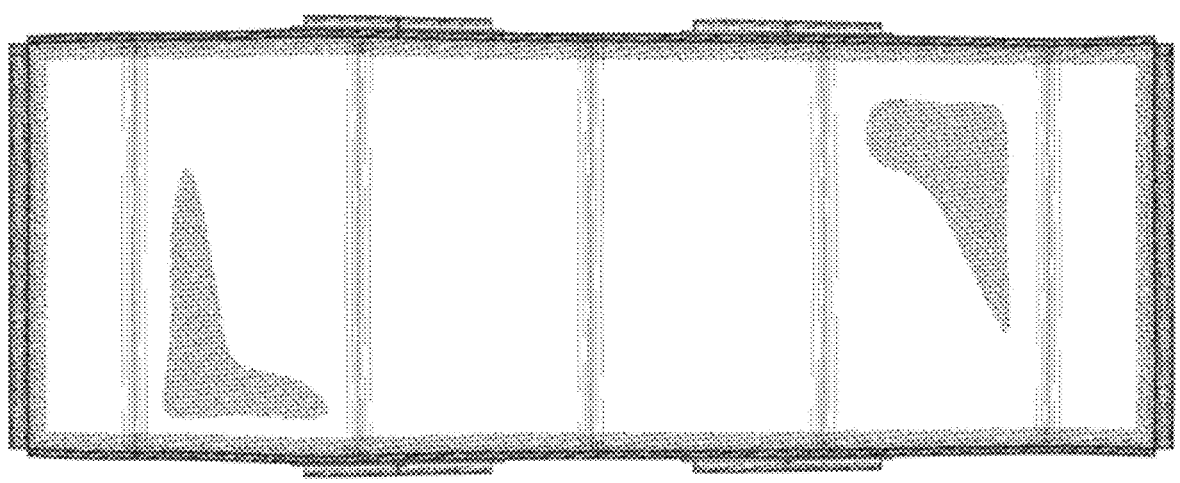
FIG. 32 is a bottom view thereof.
Figure 33:
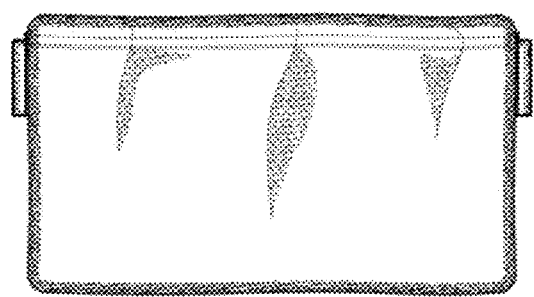
FIG. 33 is an end view thereof, the other end view being a mirror image thereof.

In the fully collapsed configuration of the collapsible wagon, the foldable base frame 310 folds to bring the flat first, second and third base frame panels (311, 312, 313) close to each other, wherein the third frame panel (313) further folds to bring its two sub-panels (314, 315) close together, so as to fold/collapse the base frame 310 from a configuration of the overall substantially flat support structure (FIG. 12) into a configuration of an overall folded structure (FIG. 21). In the folded/collapsed configuration of the foldable base frame 310 (as shown in FIG. 21), the sub-panel 315, the first and second base frame panels (311, 312) and the sub-panel 315 of the third base frame panel 313 are stacked sideways against each other in a collapsed configuration.

Figure 17:
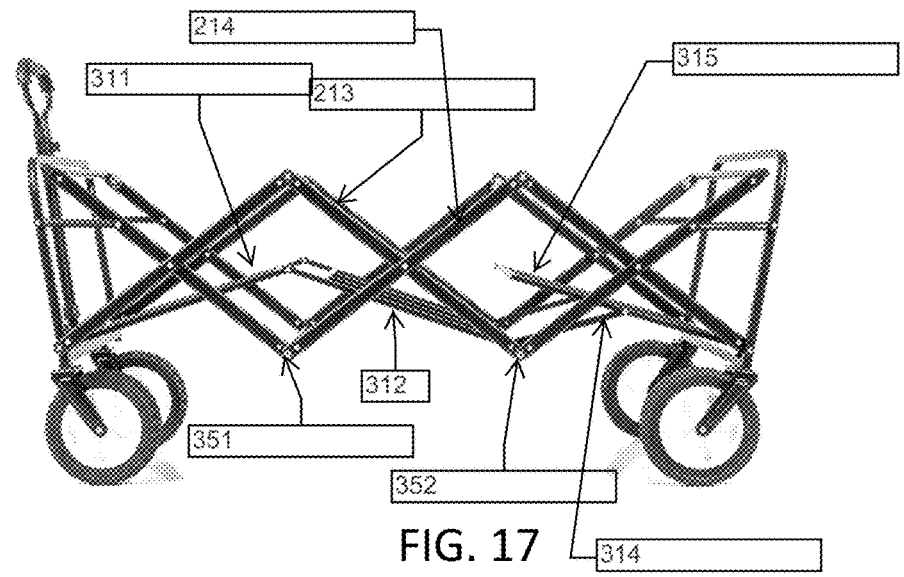
FIG. 17 is a left side view thereof, shown in a transitional state of collapse.
Figure 18:
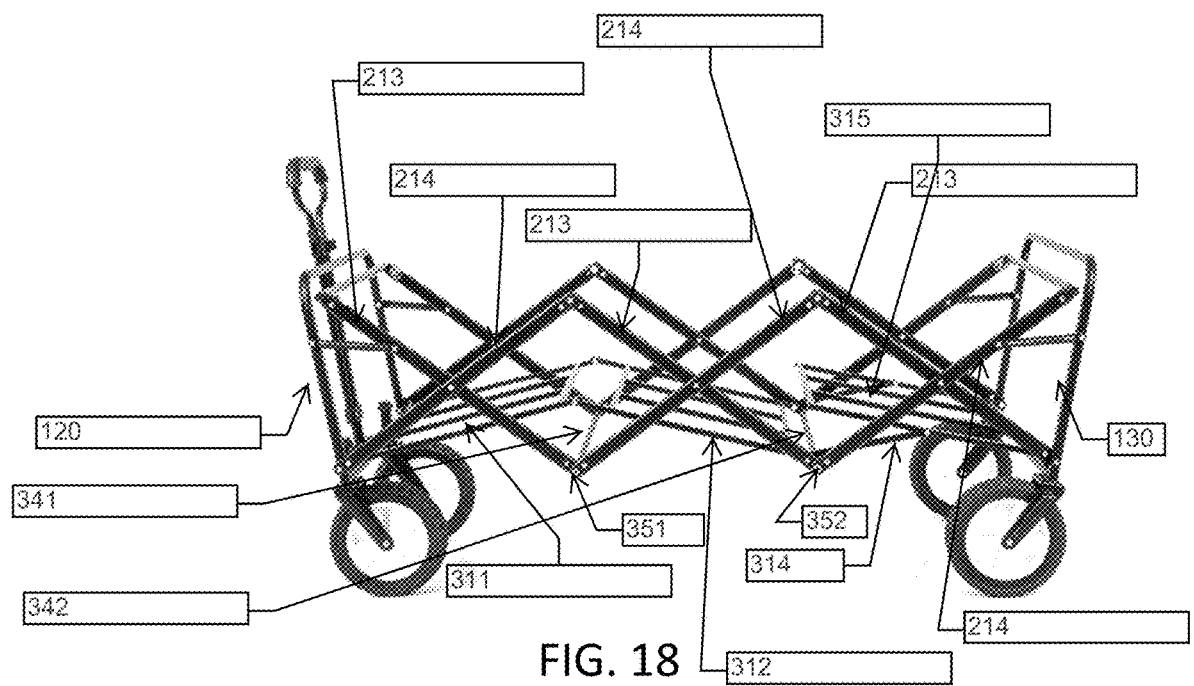
FIG. 18 is another left side view thereof, shown in a transitional state of collapse.
Figure 19:
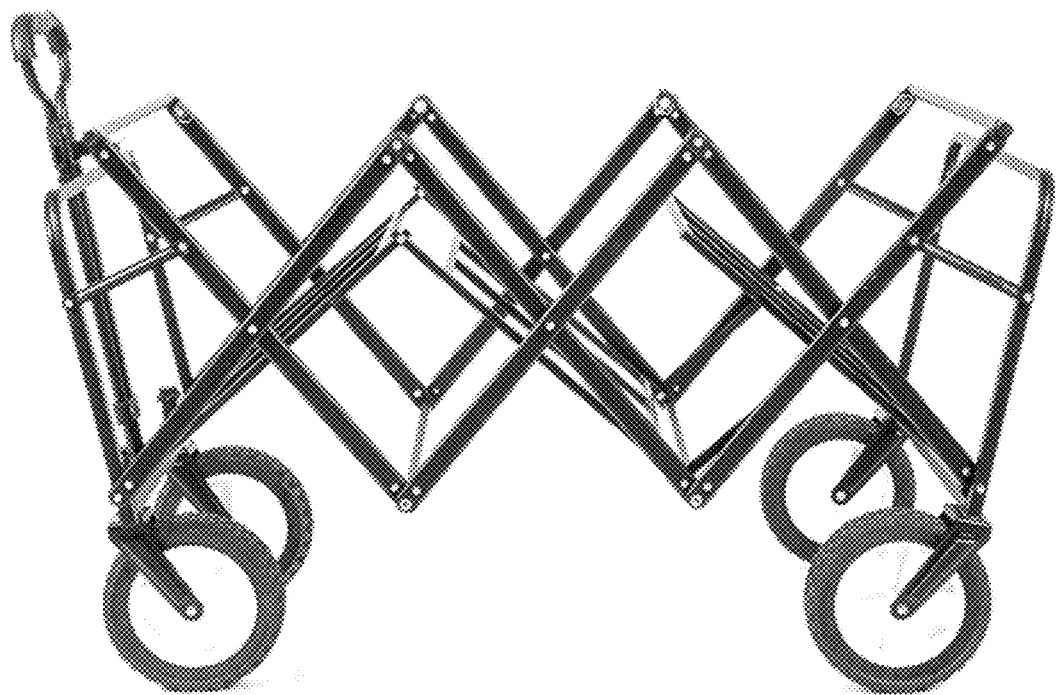
FIG. 19 is a left side view thereof, shown in a further transitional state of collapse.
Figure 20:
FIG. 20 is a left side view thereof, shown in a still further transitional state of collapse.

When the user finishes using the wagon, the size of the wagon can be significantly reduced to just occupy a minimum space. More particularly, the structure of the wagon starts to collapse when the first supporting frame 120 and the second supporting frame 130 are squeezed toward the center portion of the wagon, as shown in FIG. 17. When the first supporting frame 120 and second supporting frame 130 are being moved toward each other, the movement of the two supporting frames triggers the collapse of the connecting members 210 to minimize the size of the wagon. The wagon can be eventually minimized as shown in FIG. 21, following the progression of FIGS. 17 to 21.

Essentially, as illustrated in the drawings, the connecting members 210 each resembles a scissor hinge structure, which interconnects between the first supporting frame 120 and the second supporting frame 130. Each scissor hinge structure comprises a first connecting unit (213) and a second connecting unit (214), wherein the first and second connecting units (213, 214) are pivotally connected at a substantially pivotal center of the scissor hinge structure. For the first scissor hinge structure, the first end of the second connecting unit (214) is pivotally connected to a lower portion of the first supporting frame (120), and a second end of the second connecting unit (214) is pivotally connected to a first end of the first connection unit (213) of the adjacent second scissor hinge structure, and a first end of the first connecting unit (213) is pivotally connected to a top portion of the first supporting frame 120, and a second end of the first connecting unit (213) is pivotally connected to a first end of the second connection unit (214) of the adjacent second scissor hinge structure. For the second scissor hinge structure, the first end of the second connecting unit (214) is pivotally connected to the second end of the first connecting unit (213) of the adjacent first scissor hinge structure, and a second end of the second connecting unit (214) is pivotally connected to a first end of the first connection unit (213) of the adjacent third scissor hinge structure, and the first end of the first connecting unit (213) is pivotally connected to the second end of the second connecting unit (214) of the adjacent first scissor hinge structure, and a second end of the first connecting unit (213) is pivotally connected to the first end of the second connection unit (214) of the adjacent third scissor hinge structure. For the third scissor hinge structure, the first end of the second connecting unit (214) is pivotally connected to the second end of the first connecting unit (213) of the adjacent second scissor hinge structure, and a second end of the second connecting unit (214) is pivotally connected to a top portion of the second supporting frame (130), and the first end of the first connecting unit (213) is pivotally connected to the second end of the second connecting unit (214) of the adjacent second scissor hinge structure, and a second end of the first connecting unit (213) is pivotally connected to a lower portion of the second supporting frame (130).

Figure 11:
FIG. 11 is a perspective view thereof, shown in a full state of collapse.

A collapsible container (300) made of a flexible material is provided in the receiving space in the extended configuration of the connecting members (210) (FIG. 1), and wherein the container (300) is collapsed as the receiving space is collapsed in the collapsed configuration of the connecting members (210) (FIG. 11).

Referring to FIGS. 2, 8 to 11 and 12, 17 to 21, the sequence of folding/collapsing the wagon is illustrated. In the views of FIGS. 12, 17 to 21, the container 300 is omitted to provide a clear view of the collapsing frame structure.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:
1. An extended collapsible wagon, comprising:
a first supporting frame;
a second supporting frame; and
a pair of collapsible connecting members pivotally connected to an upper portion and a lower portion of the respective first and second supporting frames,
wherein the pair of connecting members can be configured between an extended configuration in which the first and second supporting frames are spaced apart and a receiving space is defined and extended between the first and second supporting frames and the pair of connecting members, and a collapsed configuration in which the first supporting frame is brought close to the second supporting frame to collapse the receiving space, and
wherein each connecting member comprises three scissor hinge structures pivotally interconnecting between the first and second supporting frames; and
a foldable base frame pivotally coupled to the first and second supporting frames and the pair of connecting members, located below the receiving space defined between the first and second supporting frames and the pair of connecting members, providing a support structure to support a base of a container to support heavy items on the foldable base frame, wherein the foldable base frame comprises:
first and second base frame panels each below respective one of two adjacent scissor hinge structures;
a foldable third base frame panel below the third scissor hinge structure and having two sub-panels pivotally connected to fold,
wherein the first base frame panel is pivotally connected to the second base frame panel, and the second base frame panel is pivotally connected to the third base frame, thereby forming an overall foldable base frame structure, in which the first base frame panel, the second base frame panel and the third base frame panel are foldable with respect to one another.

2. The extended collapsible wagon as in claim 1, wherein in the extended configuration, the foldable base frame unfolds to an overall substantially flat support structure for supporting the flexible collapsible container.

3. The extended collapsible wagon as in claim 2, wherein each of the first and second base frame panels is not foldable, wherein in the collapsed configuration, the foldable base frame folds to bring the first, second and third base frame panels close to each other, and wherein the third frame panel further folds to bring its two sub-panels close together, so as to collapse the foldable base frame from a configuration of the overall substantially flat support structure into a configuration of an overall folded structure.

4. The extended collapsible wagon as in claim 3, wherein the first and second supporting frames, the foldable base frame and the pair of connection members are pivotally coupled whereby the foldable base frame folds when the first supporting frame and the second supporting frame are squeezed toward a center portion of the wagon.

5. The extended collapsible wagon as in claim 3, wherein each of the first and second connecting members has one end pivotally connected to the first supporting frame and another end pivotally connected to the second supporting frame, and wherein movement of the first and second supporting frames towards each other triggers the collapse of the connecting member and the folding of the folding base frame to minimize the size of the wagon.

6. The extended collapsible wagon as in claim 5, wherein each connecting member comprises a plurality of connecting units pivotally connected between the first and second supporting frames, which pivot to extend or collapse the extended collapsible wagon.

7. The extended collapsible wagon as in claim 6, wherein in the extended configuration, the connecting units are substantially perpendicular to the second supporting frame and the first supporting frame respectively from a view from above the foldable base frame.

8. The extended collapsible wagon as in claim 1, further comprising a handle movably secured at the first supporting frame.

9. The extended collapsible wagon as in claim 1, further comprising a collapsible container made of a flexible material provided in the receiving space, wherein the container is extended as the receiving space is extended in the extended configuration of the pair of connecting members, wherein the container is collapsed as the receiving space is collapsed in the collapsed configuration of the pair of connecting members.

10. The extended collapsible wagon as in claim 1, wherein in the extended configuration, the foldable base frame unfolds to an overall substantially flat support structure for supporting the flexible collapsible container.

11. The extended collapsible wagon as in claim 1, wherein each of the first and second base frame panels is not foldable, wherein in the collapsed configuration, the foldable base frame folds to bring the first, second and third base frame panels close to each other, and wherein the third frame panel further folds to bring its two sub-panels close together, so as to collapse the foldable base frame from a configuration of the overall substantially flat support structure into a configuration of an overall folded structure.

12. The extended collapsible wagon as in claim 1, wherein the first and second supporting frames, the foldable base frame and the pair of connection members are pivotally coupled whereby the foldable base frame folds when the first supporting frame and the second supporting frame are squeezed toward a center portion of the wagon.

13. The extended collapsible wagon as in claim 1, wherein each of the first and second connecting members has one end pivotally connected to the first supporting frame and another end pivotally connected to the second supporting frame, and wherein movement of the first supporting frame and second supporting frame towards each other triggers collapse of the connecting member and the folding of the folding base frame to minimize the size of the wagon.

14. The extended collapsible wagon as in claim 1, wherein each connecting member comprises a plurality of connecting units pivotally connected between the first and second supporting frames, which pivot to extend or collapse the extended collapsible wagon.

15. The extended collapsible wagon as in claim 14, wherein in the extended configuration, the connecting units are substantially perpendicular to the second supporting frame and the first supporting frame respectively from a view from above the foldable base frame.

* * * * *